United States Patent Office 3,455,715
Patented July 15, 1969

3,455,715
STARCH CONVERSION
Jaakko E. Niilo-Rama, Wisconsin Rapids, Wis., assignor to Consolidated Papers, Inc., Wisconsin Rapids, Wis., a corporation of Wisconsin
No Drawing. Filed Jan. 18, 1968, Ser. No. 698,711
Int. Cl. C08b 27/14
U.S. Cl. 106—214               7 Claims

ABSTRACT OF THE DISCLOSURE

Conversion of starch with aluminum nitrate and heat especially for use in paper coating compositions; and paper coating compositions and coated paper made therewith.

---

The present invention relates to the rapid chemical conversion of startch (or its equivalent low degree of carboxy methyl substitute derivatives) with the aid of aluminum nitrate and heat to gelatinize the starch and reduce its viscosity to the degree conventional for use in paper coatings. Starch pastes formed therefrom are characterized by their relatively light color.

Starch conversion techniques, enzymatic or oxidative, usually involve liquid type treatments for relatively long times. As distinguished from this, raw starch or its equivalent low substituted carboxy methylated derivates can be converted instantaneously when mixed with aluminum nitrate followed by heat treatment at a temperature of at least 125° C. In use of aluminum nitrate a rapid decomposition thereof occurs at a temperature of between about 135–140° C. resulting in, in dry heat, nitrogen dioxide and oxygen for oxidation according to the following equation:

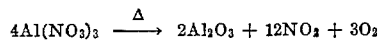

$$4Al(NO_3)_3 \xrightarrow{\Delta} 2Al_2O_3 + 12NO_2 + 3O_2$$

Similarly, as in oxidation of cellulose with nitrogen dioxide, the main reaction between the released nitrogen dioxide and starch should be between the dioxide and primary alcohol group at No. 6 carbon atom of starch. No oxidation of starch is so specific, however, that it will not result in some degradation. Thus, also a degradation or conversion of starch to a lower viscosity is obtained, especially in the presence of oxygen, but because this is not the main reaction, the degradation is milder than, for instance, with hydrogen peroxide, or other peroxides, persulfates, perborates, etc. Oxidation, for example, by peroxides or persulfates appears to be essentially degradative, probably proceeding by way of hydroxyl radicals that cause extensive oxidation at relatively few random sites along the chain. This in mind, the difference between aluminum-nitrate-oxidized or peroxide (persulfate, perborate) oxidized starch can be expected to be considerable. At the present, the action of $Al(NO_3)_3$ on starch in wet conditions is not clear, but probably also a partial acid hydrolysis takes place in a solution.

The presence of bound nitrogen in the early stage of the oxidation of cellulose and similarly with starch, suggests the formation of nitrite ester by way of a nitrosonium ($NO^+$) ion, as follows:

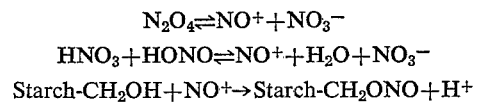

$$N_2O_4 \rightleftharpoons NO^+ + NO_3^-$$
$$HNO_3 + HONO \rightleftharpoons NO^+ + H_2O + NO_3^-$$
$$Starch\text{-}CH_2OH + NO^+ \rightarrow Starch\text{-}CH_2ONO + H^+$$

In one specific embodiment of the present invention an aqueous slurry of starch of about 35% by weight was prepared including aluminum nitrate, the resulting suspension filtered and reduced to a fairly dry starch cake, say of about 9–10% moisture, and then heated for about 10 minutes at a temperature above 125° C., say at about 150° C. or even as high as 170° C., for about ten minutes. The aluminum nitrate can be in the proportion of .025 to about 15% by weight of the dry starch and the resultant dry heated cake can be pulverized and sold for use in paper making, the only requirement being that the paper maker convert the powder to an aqueous slurry and heat it to gelatinize it for use in paper coatings which are conventionally employed in combination with mineral pigments such as paper coating clay.

The viscosity of the starch has been reduced by dry heating of the starch cake. The paper maker simply makes up the paste.

In another specific embodiment of the present invention the step of forming the dry cake is bypassed and the raw starch after being mixed with the aluminum nitrate is directly heated by the paper coater to a point of starch conversion, gelatinization and reduction of viscosity to that desired for paper making.

Thus, 200 grams of starch were slurried in 250 milliliters of water in a series of experiments with the following amounts of aluminum nitrate:

Experiment:
  (a) _____ 3 grams or 1.50% on dry starch.
  (b) _____ 6 grams or 3.00% on dry starch.
  (c) _____ 15 grams or 7.50% on dry starch.
  (d) _____ 30 grams or 15.0% on dry starch.

After mixing, the slurry was filtered through a suction funnel. The volume of the solution retained in the cake was approximately 140 milliliters. The wet cake was dried at 40° and 45° C. in a forced air oven, and the dry starch cake heat-treated at 150° C. for 10 minutes. After completion of the heat treatment, the starch was powderized in a high speed mixer, and then cooked in a starch cooker at 20 percent solids for another 10 minutes at 150° C. The viscosity of the obtained starch paste was measured at 32° C. with the following results:

| $Al(NO_3)_3 \cdot 9H_2O$, percent on starch | Brookfield viscosity, 32° C. | Paste solids, percent |
|---|---|---|
| 1.48(a) | 29,000 | 20 |
| 2.96(b) | 16,100 | |
| 7.40(c) | 11,780 | |
| 14.80(d) | 2,500 | |

In another specific example a continuous steam injection cooker was employed. Here 5 pounds of starch were slurried with water to make approximately 32% slurry with aluminum nitrate employed in the amounts of .025 to 1% by weight of the starch. The starch slurry was agitated continuously and passed through the cooker, while injecting with steam at 160 to 170° C. and maintaining from 100 to 110 pounds back pressure. Due to dilution by steam, the paste was collected approximately at 25% solids content. The dwell time in the cooker was approximately four minutes. The viscosity measurements for the paste were carried out at 55° C. with the following results:

| $Al(NO_3)_3 \cdot 9H_2O$, percent on starch | Brookfield viscosity, 55° C. | Paste solids, percent | Solids coating Percent | Solids coating Visc. | IGT pick (c.f.) |
|---|---|---|---|---|---|
| 0.025 | 9,375 | 24.0 | 49.2 | 11,570 | 75 |
| .05 | 12,600 | 24.4 | 52.0 | 18,600 | |
| .1 | 8,400 | 24.5 | | | |
| .2 | 11,940 | 25.1 | 52.0 | 18,300 | |
| .3 | 7,300 | 23.9 | 51.6 | 7,300 | |
| .7 | 6,300 | 24.8 | 51.8 | 30,600 | |
| 1 | 385 | 24.6 | 51.8 | 1,100 | |

The resulting starch paste was a light colored product without brownish discoloration such as in the case of ammonium persulfate and peroxide conversion.

The use of small amounts of copper sulfate has a beneficial effect on the oxidation such as for example 200 parts per million copper sulfate with a starch composition employing 0.175% aluminum nitrate by weight of the starch in an original 35% slurry.

Pigment slips were prepared at about 70% solids content using predispersed paper coating clay in soft water. Coating composition was prepared employing 5000 grams of the aforesaid predispersed clay; 1600 grams of 35% solids starch prepared as above; 63 parts of 48% dispersion of calcium stearate and 400 parts of water, and paper coated therewith by conventional blade coating technique.

I claim:
1. The method of converting starch for use in paper coating compositions which comprises mixing an aqueous slurry of raw starch with from about .025 to about 15% by weight of aluminum nitrate, and reacting the resultant slurry at a temperature above about 125° C. to about 170° C.
2. The method of claim 1 wherein the mixture is dried to cake form before subjecting it to said heat and then subjected to said heating in dry form.
3. The product formed in accordance with the process of claim 2.
4. The method of claim 1 wherein the cooking of the converted starch is continued to gelatinize it and to reduce its viscosity to a paper coating composition adhesive.
5. The method of claim 2 wherein the heated starch cake is pulverized, slurried with water, and further heated to a paper coating adhesive.
6. The method of making a paper coating composition which comprises reacting a raw starch by heating to about 170° C. an aqueous slurry thereof with from about 0.25 to about 15% by weight of aluminum nitrate and to thereby form a gelatinized starch adhesive of paper coating viscosity and mixing said adhesive with an aqueous slurry of paper coating mineral pigment.
7. Paper coated with a mineral pigment and starch binder composition, said starch binder being the gelatinized product of raw starch and from about .025 to about 15% by weight of aluminum nitrate reacted therewith at a temperature above about 125° C. to about 170° C.

References Cited

UNITED STATES PATENTS 3,377,339  4/1968  Sisido _____ 260—233.3
2,937,105  5/1960  Cazemier _____ 106—213

JULIUS FROME, Primary Examiner

T. MORRIS, Assistant Examiner

U.S. Cl. X.R.

117—156; 127—33, 71; 260—233.3